Figure 1:
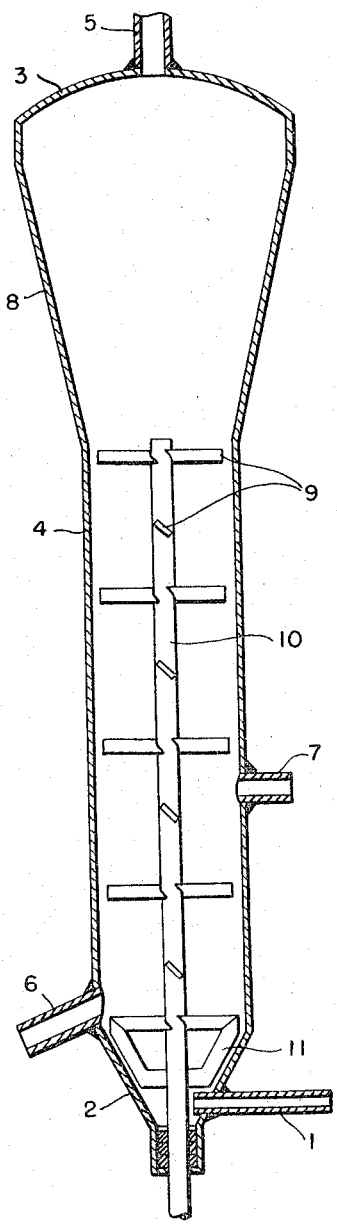

INVENTORS:
KARL SCHMID
JOACHIM STEDEFEDER
GUENTHER JOHN
MANFRED HAEBERLE
HANS LAUTENSCHLAGER
HANS GEORG TRIESCHMANN
BY

ATT'YS

United States Patent Office 3,300,457
Patented Jan. 24, 1967

3,300,457
PROCESS AND APPARATUS FOR THE POLYMERIZATION OF MONOOLEFINES
Karl Schmid, Ludwigshafen (Rhine), Joachim Stedefeder, Frankenthal, Pfalz, Guenther John, Ludwigshafen (Rhine), Manfred Haeberle, Mannheim, Hans Lautenschlager, Ludwigshafen (Rhine), and Hans Georg Trieschmann, Hambach, Weinstrasse, Germany, assignors to Badische Anilin- & Soda-Fabrik Aktiengesellschaft, Ludwigshafen (Rhine), Germany
Filed May 9, 1963, Ser. No. 279,222
Claims priority, application Germany, May 11, 1962, B 67,195
2 Claims. (Cl. 260—88.2)

This invention relates to a process for the polymerization of monoolefins in a fluidized bed and an apparatus for carrying out the process.

It is known that ethylene can be polymerized using catalysts containing chromium oxide at temperatures between about 65° and 120° C. under increased pressure in a fluidized bed consisting of polyethylene particles and catalyst, at flow velocities between about 6 and 15 cm./sec. In this known process however the polyethylene is not obtained in a shape suitable for the fluidized bed so that there are formed in the fluidized bed not only strongly moving zones but also zones where there is very little movement and where the polyethylene sinters together and forms lumps. In the most favorable case, the process can be carried on for a relatively short space of time but not for uninterrupted periods of several hours or days as required for a technical process.

The object of this invention is to provide a process for the polymerization of monoolefins in a fluidized bed which can be carried out continuously on a technical scale. Another object of this invention is to provide an apparatus for carrying out the polymerization of monoolefins in a fluidized bed.

It is also known that ethylene can be polymerized in a fluidized bed using catalysts of alkylaluminum compounds and compounds of metals of Groups IV to VIII of the Periodic System (see "Handbook of Chemistry and Physics" 38th edition, Chemical Rubber Publishing Co., Cleveland, Ohio, U.S.A., 1956) at temperatures below the softening point of polyethylene and at pressures below 200 atmospheres. It is not possible to carry out this process continuously over many hours and days because the polyethylene is again not obtained in a form suitable for fluidized beds and this leads to local sintering and formation of lumps.

We have now found that monoolefins, particularly ethylene and/or propylene, can be polymerized advantageously in a fluidized bed consisting of the catalyst and polymer formed, using catalysts containing chromium oxide or catalysts of alkylaluminum and/or alkylberyllium compounds and compounds of Groups IV-B to VII-B and VIII of the Periodic System at temperatures below the softening point of the polymer formed and pressures between atmospheric pressure and about 100 atmospheres, at a flow velocity of the monoolefins in the fluidized bed of up to about 15 cm./sec. when the ratio of the diameter of the fluidized bed to its height is between 1:1 and 1:8 and the fluidized bed is stirred in such a way that the particles of polymer being formed and the particles of the catalyst are moved in the direction of flow of the monoolefins by means of a stirrer having stirring blades arranged at intervals along the shaft which rotates at 20 to 250 r.p.m. The speed of the stirrer is preferably between 50 and 150 r.p.m.

Obviously when using higher monoolefins, the process is carried out at such pressures and temperatures that the monoolefins being polymerized are gaseous. The flow velocity of the monoolefins is preferably between 5 and 15 cm./sec.

For the polymerization of ethylene, the conventional catalysts may be used for carrying out the process, particularly the catalysts containing chromium oxide known from U.S. Patent No. 2,825,721, in which chromium oxides are supported on carriers, such as silicon dioxide, aluminum oxide or aluminum silicates, or also Ziegler catalysts.

In the case of catalysts containing chromium oxide it is known that the chromium oxides form the catalytic component and that the carrier activates them.

Particularly suitable chromium oxide-silicon dioxide-aluminum oxide catalyst (the production of which is not claimed in the present specification) is obtained as a rule by impregnating pulverized silicon dioxide or aluminum oxide or a mixture or compound of the two with an aqueous solution of chromium trioxide or a compound which can be converted into chromium oxide by heating. The catalyst is then dried and heated for a period of three to ten hours or more at a temperature of about 100° to 800° C.

It has been found that the character of the polymers can be affected by the activation treatment within the said temperature range. If the catalyst has been activated at temperatures in the upper portion of this range, particularly between 700° and 800° C., the polymerized product has a lower molecular weight and contains less adhesive and solid polymers, whereas a catalyst which has been activated in the lower portion of the said range causes the formation of a larger proportion of higher, adhesive and solid polymers.

The catalyst may be prepared using chromium trioxide, chromium nitrate, chromium chloride, chromium sulphate and other soluble chromium compounds. The maximum yields are achieved with a catalyst which, after activation, contains only chromium oxides. It is preferred to impregnate with chromium trioxide ($CrO_3$). Chromium nitrate may, however, be used with the same results. It is to be assumed that during the activation the catalyst prepared from chloride and sulphate is converted at least partly into oxide. The amount of chromium oxide in the catalyst may be between 0.1 and 10% by weight of the whole catalyst.

The preferred carrier is a mixture or compound of silicon dioxide and aluminum oxide containing a preponderance of silicon dioxide and a minor proportion of aluminum oxide. A carrier which has proved to be particularly active consists of 90% of silicon dioxide and 10% of aluminum oxide which have previously been coprecipitated.

By Ziegler catalysts we mean mixtures of alkyl compounds of aluminum and/or beryllium and compounds of metals of Group IV-B to VII-B and VIII of the Periodic System. Particularly suitable alkylaluminum and/or beryllium compounds usually have linear and/or branched alkyl groups having one to ten carbon atoms and alkylaluminum compounds having linear and/or branched alkyl groups having one to four carbon atoms are preferred. Examples of suitable alkyl compounds are dimethylberyllium, diethylberyllium, triisobutylberyllium, dioctylberyllium, trimethylaluminum, triethylaluminum, tripropylaluminum, triisopropylaluminum triisobutylaluminum, trihexylaluminum, trioctylaluminum, tri-(2-ethylhexyl) aluminum, tridecylaluminum, methyldiethylaluminum, ethyldiisobutylaluminum, methylaluminum dichloride, methylaluminum sesquichloride, ethylaluminum dichloride, ethylaluminum sesquichloride, propylaluminum dichloride, diisobutylaluminum chloride, diethylaluminum hydride, diisobutylaluminum hydride, ethylaluminum dibromide, octylaluminum dichloride, 2-ethylhexylaluminum dichloride, di-2-ethylhexylaluminum chloride, nonylaluminum dichloride and 2-ethyloctylaluminum dichloride.

Among the metal compounds of Groups IV–B to VIII–B and VIII of the Periodic System, the halides and acetylacetonates are quite especially suitable as Ziegler catalysts. The preferred compounds are the chlorides of titanium and vanadium, particularly titanium tetrachloride, titanium trichloride and the complex compound having the general formula $3TiCl_3 \cdot AlCl_3$. Other examples of such metal compounds are zirconium tetrachloride, zirconium acetylacetonate, titanium acetylacetonate, vanadium–III chloride, vanadium oxychloride, vanadium–IV chloride, chromic chloride, molybdenum chlorides, manganous chloride, ferric chloride, cobalt chloride and nickel chloride. These Ziegler catalysts may be prepared by conventional methods and are suitable also for polymerization according to this invention of propylene, butene-1, pentene-1, 4-methylpentene-1, hexene-1 and other monoolefins, especially for the polymerization of α-monoolefins having two to six carbon atoms.

The catalysts may be applied to polyolefins and introduced in this form into the polymerization vessel for the polymerization. It is advantageous to use the same polyolefins as are formed in the polymerization. In particular cases, especially in the polymerization of ethylene and propylene, it is advantageous to dilute the reaction mixture with conventional inert inorganic fillers, such as silicon dioxide, alkali metal silicates, alkaline earth metal silicates, alkaline earth metal carbonates and especially carbon black. The catalyst may also be applied to these fillers and introduced in this form into the reaction vessel. The amount of filler may be varied within wide limits in the process when ethylene and propylene are being copolymerized using Ziegler catalysts. The amounts usually are between 2 and 50% by weight with reference to the solids content of the reaction mixture, i.e. with reference to the total weight of copolymers, fillers and catalysts.

The temperature of the reaction mixture during the polymerization must be below the softening temperature of the polymers because otherwise the particles of polymer will sinter together and also to the reaction vessel and the stirrer. In general the polymerization is carried out at a temperature between room temperature and the softening point of the polyolefin and it is advantageous to make provision, by efficient removal of heat, that the reaction temperature remains about 10° to 20° C. below the softening temperature of the polyolefin. A temperature between about 20° C. and about 170° C. is usually chosen for the polymerization.

In the polymerization of propylene it is advantageous to use catalysts of alkylaluminum compounds and/or alkylberyllium compounds and compounds of metals of Group IV–B to VII–B and VIII of the Periodic System which have been modified by additives which increase their stereospecificity, such as monoamines, salts of ternary and quaternary bases of an element of Group V–A or VI–A of the Periodic System, phosphoric esters, phosphorous esters, triarylphosphine oxides, trialkylphosphine oxides, phosphorous oxyhalides, amine oxides or equivalent compounds of arsenic, antimony or bismuth, polybasic amines, polyvalent aliphatic aromatic, araliphatic or heterocyclic ethers, amino ethers, aminoketones, carboxylic amides, or thiocarboxylic amides. Suitable compounds of this type are described in U.S. patent applications Serial No. 139,852, filed September 22, 1961, by Joachim Stedefeder and Hans Lautenschlager, and Serial No. 139,854, filed at the same date by Hans Lautenschlager and Joachim Stedefeder, and now abandoned. Polypropylene is then obtained having a proportion of 90 to 95% by weight of isotactic polypropylene which can be determined in the usual way, for example as the fraction which is insoluble in boiling heptane.

Such additives not only increase the stereospecificity of the Ziegler catalysts, but also increase the yield of polymer per gram of catalyst and promote the formation of compact granular polymers which are of advantage for continuous troublefree operation of the process. Moreover in the polymerization of propylene it is possible to vary the molecular weight of the polypropylene formed by varying the polymerization temperature. For example at a polymerization temperature of 40° C., polypropylene having the intrinsic viscosity $[\eta]=8.5$ (100 ml./g.) is obtained, and at 125° C., polypropylene having the intrinsic viscosity $[\eta]=1.5$ (100 ml./g.).

The olefin polymers are generally obtained in the fluidized bed in the process with granule sizes between about 0.03 and 3 mm. They have molecular weights between about 80,000 and 1,000,000 and even up to 4,000,000 (determined according to Überreiter, "Makromolekulare Chemie," volume 8 (1952), 21–28). The process is distinguished from the prior art processes above all by the fact that the polymerization proceeds without any disturbance and can be carried out continuously for practically indefinite periods. Moreover, uniform temperature control is possible in the polymerization vessel during the process and even very small particles of polymer and catalyst are entrained by the gaseous monoolefins, which are preferably recycled, at the most to only a practically negligible extent.

Figure 2:
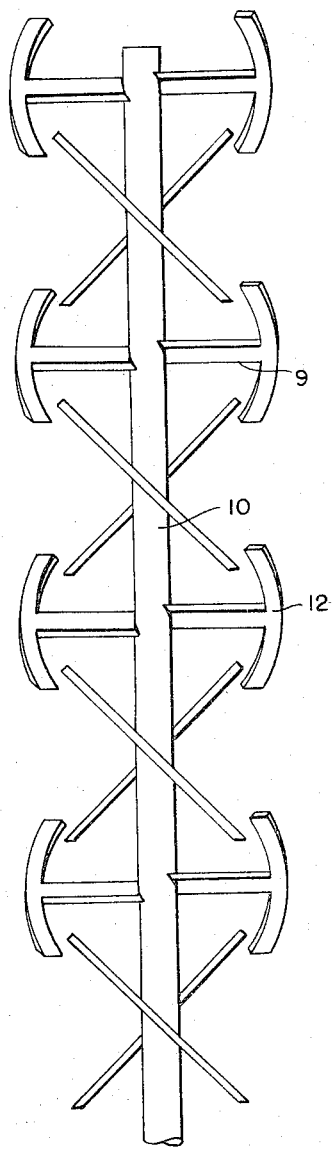

The invention will now be described with reference to the accompanying drawings in which FIGURE 1 is a sectional elevation of an apparatus suitable for carrying out the process according to this invention and FIGURE 2 is an elevation of an alternative form of stirring means.

Referring first to FIGURE 1, a gaseous monoolefin, for example ethylene, is passed through a pipe 1 into a substantially cylindrical container 4 having a bottom 2 and a cover 3. The container 4 is provided with at least one pipe 5 for withdrawal of unreacted ethylene and at least one pipe 6 for withdrawal of polymer formed and also one or more pipes 7 for the supply of catalyst at a suitable point or points. The container 4 has an outwardly tapering portion 8 toward the top. The ratio of the diameter of the cylindrical portion to the maximum diameter of the tapering portion 8 is usually between 1:2 and 1:8, preferably between 1:3 and 1:5. A stirrer shaft 10 having a plurality of spaced blades 9 is provided in the cylindrical portion of the container. The lower part of the shaft 10 may advantageously be provided with a scraper 11. Pipe 1 may be arranged to cause the monoolefins to flow in at the bottom of the container axially or tangentially. The blades 9 are arranged obliquely on the shaft 10 so that they cause an upward movement of the material contained in the container. The blades 9 may be flat or curved and may for example be arranged spirally on the shaft 10. The blades may, however, also be arranged in a plurality of planes on the shaft and if desired staggered with respect to each other. The planes may be equally or unequally spaced apart but it is preferred that the distance between the planes should be substantially equal. The distance between the planes of the blades may be varied within wide limits.

It has proved to be particularly advantageous to provide the outer ends of the blades 9, as shown in FIGURE 2, with portions 12 in the form of segments of a ring, the blades, when the stirrer is viewed in plan, being arranged on axes perpendicular to the axis of the stirrer and uniformly twisted with respect to each other. The portions 12 may be segments of circular rings or of elliptical rings and may be plane or, preferably, slightly curved. The distance between the outer edges of the portions 12 and the inner wall of the container 4 is made as small as possible and is usually between 1 and 50 mm., depending on the size of the apparatus.

The heat of polymerization is removed partly through the wall of the vessel and partly by way of the gas stream. It may be advantageous to supply the monoolefins to be polymerized to the polymerization vessel under pressure in liquid form, the monoolefin thus evaporating within the polymerization vessel and thus wholly or partly absorbing the heat of polymerization as heat of vaporisation.

The invention will be further illustrated by the following examples in which parts and percentages are by weight. The α-monoolefin which is not polymerized is recycled.

Example 1

Ethylene is continuously polymerized using a conventional catalyst containing chromium oxides and being supported on aluminum silicate, at a pressure of 36 atmospheres and a temperature of 95° C. in an apparatus corresponding to that shown in FIGURE 1. The ratio of the diameter of the fluidized bed of polyethylene powder in the cylindrical portion of the container to the height of the same is 1:5. The ratio of the diameter of the cylindrical portion of the container to the maximum diameter of the tapered upper portion is 1:3 and the ratio of the height to the maximum diameter of the tapered upper portion 1·3:1. The stirrer provided in the apparatus has twenty flat blades arranged obliquely in ten planes substantially as shown in FIGURE 2. The stirrer speed is 123 r.p.m. 23.5 parts of ethylene and 0.002 part of catalyst are freshly supply to the container per hour. The flow velocity of the ethylene in the cylindrical portion of the container is 7 to 8 cm./sec. The reaction product obtained per hour at 21 parts of powdered polyethylene having a molecular weight of 400,000 and an ash content of 0.01%.

Example 2

Ethylene is polymerized continuously in the apparatus described in Example 1 at 6 atmospheres and 50° C. in the presence of a catalyst of triisobutylaluminum and titanium trichloride. 20 parts of ethylene and 0.019 part of catalyst are freshly supplied to the apparatus per hour. The flow velocity of the ethylene in the cylindrical portion of the container of the apparatus is 6 to 7 cm./sec. and the speed of the stirrer is 123 r.p.m. The reaction product obtained per hour is 16 parts of powdered polyethylene having a molecular weight of about 100,000 and an ash content of 0.12%.

The catalyst used is prepared under nitrogen by mixing 20 parts of titanium trichloride with 2000 parts of powdered polyethylene and adding to the mixture while stirring a solution of 77 parts of triisobutylaluminum in 400 parts of n-pentane. The pentane is then evaporated under subatmospheric pressure.

Example 3

Propylene is continuously polymerized at 40° C. and 9 atmospheres in the presence of a catalyst of titanium trichloride, triethylaluminum and di-n-butylformamide in the apparatus described in Example 1. The flow velocity of the propylene in the cylindrical portion of the container is 5 to 6 cm./sec. and the speed of the stirrer is 200 r.p.m. 25 parts of propylene and 0.06 part of catalyst are freshly supplied to the apparatus per hour. The reaction product obtained per hour is 18 parts of polypropylene having an intrinsic viscosity $[\eta]=8.5$ (100 ml./g.) and exhibiting a fraction of 92% which is insoluble in boiling heptane.

The catalyst used is prepared as follows:

A mixture of 1.25 parts of titanium trichloride and 25 parts of powdered polypropylene is mixed with 0.4 part of di-n-butylformamide. The mixture obtained is mixed with 2.28 parts of triethylaluminum.

Example 4

Propylene is continuously polymerized at 85° C. and 6 atmospheres in the presence of the catalyst described in Example 3 in the apparatus described in Example 1. The flow velocity of the propylene in the cylindrical portion of the container is 7 cm./sec., and the speed of the stirrer is 150 r.p.m. 16 parts of propylene and 0.05 part of catalyst are freshly supplied to the apparatus per hour. The reaction product obtained per hour is 12 parts of polypropylene having an intrinsic viscosity $[\eta]=4.3$ (100 ml./g.) and exhibiting a fraction of 92.5% which is insoluble in boiling hetane.

Example 5

Propylene is continuously polymerized at 110° C. and 7 atmospheres in the presence of the catalyst described in Example 3 and in the apparatus described in Example 1. The flow velocity of the propylene in the cylindrical portion of the container is 6.5 cm./sec., and the speed of the stirrer is 120 to 150 r.p.m. 20 parts of propylene and 0.07 part of catalyst is freshly supplied to the apparatus per hour. The reaction product obtained per hour is 16 parts of polypropylene having an intrinsic viscosity of $[\eta]=2.8$ (100 ml./g.) and exhibiting a fraction of 91.0% which is insoluble in boiling heptane.

Example 6

Ethylene is continuously polymerized using a conventional catalyst containing chromium oxides and having silicon dioxide as support material, at a pressure of 36 atmospheres and an average temperature of 100° C. in an apparatus corresponding to that shown in FIGURE 1. The ratio of the diameter of the polyethylene powder fluidized bed in the cylindrical portion of the reactor to the height of the same is 1:7. A stirrer is provided in the apparatus and the shaft of the stirrer is provided in ten planes with twenty blades made from tubes arranged similarly to the flat blades shown in FIGURE 2. The speed of the stirrer is 60 r.p.m. The flow velocity of the ethylene in the cylindrical portion of the container is 14 cm./sec. 28 parts of ethylene and 0.005 part of catalyst are freshly supplied to the container per hour. The reaction product obtained per hour is 25 parts of powdered polyethylene having a molecular weight of about 400,000 and having an ash content of 0.02%.

Example 7

A mixture of ethylene and butene-1, containing 14% by weight of butene-1, is polymerized using a conventional catalyst containing chromium oxides and having aluminum silicate as support material, in an apparatus corresponding to that shown in FIGURE 1. The ratio of the diameter of the fluidized bed to its height is 1:1. Four blades are arranged in two planes on the central stirrer shaft. The speed of the stirrer is 90 r.p.m. Continuous polymerization takes place at a pressure of 35 atmospheres and a temperature of 97° C., the flow velocity of the gas mixture in the cylindrical portion of the container being 11 cm./sec. 22 parts of ethylene, 0.4 part of butene-1 and 0.005 part of catalyst are freshly supplied to the reactor per hour. The reaction product obtained per hour is 20 parts of copolymer having a density of 0.940 g./cc., a molecular weight of 340,000 and an ash content of 0.02%.

Example 8

Propylene is continuously polymerized at 70° C. and 17 atmospheres pressure in the presence of a catalyst of triethylaluminum, titanium trichloride and triphenylphosphine oxide in an apparatus corresponding to that shown in FIGURE 1. The molar ratio of triethylaluminum: titanium trichloride:triphenylphosphine oxide is 2:1:0.8. The flow velocity of the propylene in the cylindrical portion of the reactor is 8 cm./sec. 25 parts of propylene and 0.06 part of catalyst is freshly supplied to the apparatus per hour. The ratio of the diameter of the fluidized bed to its height is 1:5 and the speed of the stirrer is 120 r.p.m. The reaction product obtained per hour is 18 parts of polypropylene having an intrinsic viscosity $[\eta]=11.5$ (100 ml./g.).

If about 5% by volume of hydrogen be added to the propylene, the polypropylene obtained has an intrinsic viscosity $[\eta]=4.5$ (100 ml./g.).

In both cases the proportion of the polypropylene which is insoluble in boiling heptane is 92 to 95%.

Example 9

A catalyst of triethylaluminum, titanium trichloride and diethylene glycol diethyl ether, in which the molar ratio of these components in the sequence given is 2:1:0.3 is used under the conditions specified in Example 8. Under otherwise identical conditions and without adding hydrogen, 18 parts per hour of polypropylene is obtained having an intrinsic viscosity of $[\eta]=9.5$ (100 ml./g.).

Example 10

A catalyst of diethylaluminum chloride, titanium trichloride and triphenylphosphine oxide in which the molar ratio of the said components in the sequence given is 2:1:0.8 is used under the conditions specified in Example 8. 23 parts per hour of fresh propylene is supplied to the reactor. Under otherwise identical conditions, 17 parts of polypropylene per hour is obtained having an intrinsic viscosity of $[\eta]=9.5$ (100 ml./g.).

When about 5% by volume of hydrogen is added to the propylene, the intrinsic viscosity of the polypropylene obtained is $[\eta]=2.4$ (100 ml./g.).

The proportion of the polypropylene obtained which is insoluble in boiling heptane is 92 to 96% in both cases.

Example 11

Propylene is polymerized continuously in an apparatus which corresponds to that shown in FIGURE 1 with a catalyst of the complex compound $3TiCl_3 \cdot AlCl_3$, diethylaluminum chloride and triphenylbutylphosphonium chloride chloride ($(C_6H_5)_3PC_4H_9Br$) in which the molar ratio of the components in the given sequence is 0.33:2:0.032. The ratio of diameter to height of the fluidized bed of polymer powder in the cylindrical portion of the reactor is 1:5, and the flow velocity of the propylene is 10 cm./sec. The speed of the stirrer, which is constructed according to FIGURE 2, is 70 r.p.m. Polymerization is carried out at a pressure of 17 atmospheres and a temperature of 70° C. 25 parts of propylene and 0.06 part of catalyst is freshly supplied per hour to the reactor. 18 parts per hour of polypropylene having an intrinsic viscosity $[\eta]=8$ to 12 (100 ml./g.) is obtained. The proportion which is insoluble in boiling heptane is 92 to 96%. After separation of the catalyst residues and amorphous portions, it is well suited, even without the preparation of shaped pieces, for the injection moulding method and also for the production of fibres and sheets.

Example 12

A mixture of ethylene and propylene is polymerized in an apparatus as shown in FIGURE 1 at a gas flow velocity of 8 cm./sec. in the cylindrical portion of the reactor at 30° C. and 11 atmospheres. The ratio of the diameter to the height of the fluidized bed is 1:4. The catalyst used is a mixture A of 2 parts of methylaluminum sesquichloride and 25 parts of carbon black together with a mixture B of 1.4 parts of vanadium oxychloride and 25 parts of carbon black. The carbon black has been dried for ten hours at 50° C. under subatmospheric pressure ($10^{-3}$ mm. Hg). The speed of the stirrer is 50 r.p.m. 22 parts of ethylene, 18 parts of propylene and, as catalyst, a mixture A of 0.2 part of methylaluminum sesquichloride and 2.5 parts of carbon black and a mixture B of 0.14 part of vanadium oxychloride and 2.5 parts of carbon black are freshly supplied per hour. 45 parts per hour of an elastomeric ethylene/propylene copolymer containing carbon black is obtained which contains 45% of propylene in polymerized form and which is suitable for the production of elastomeric shaped articles, for example tires.

15 parts of carbon black may be used as carrier for the catalyst components instead of 2.5 parts of carbon black. Then 70 parts per hour of ethylene/propylene copolymer containing carbon black is obtained.

Powdered calcium carbonate may also be used instead of carbon black.

Example 13

4-methylpentene-1 is polymerized under atmospheric pressure at 80° C. in an apparatus as shown in FIGURE 1. The ratio of the diameter to the height of the fluidized bed is 1:2. The catalyst used is a mixture of 2 parts of diethylaluminum chloride and 1 part of the complex compound $3TiCl_3 \cdot AlCl_3$. The flow velocity of 4-methylpentene-1 is freshly supplied in the liquid state at a temperature of 40° C. per hour at the lower end of the reactor. Most of the polymerization heat is absorbed by vaporisation of the 4-methylpentene-1. 20 parts per hour of poly-4-methylpentene-1 having an intrinsic viscosity $[\eta]=6.5$ (100 ml./g.) is obtained with a fraction of 84% which is insoluble in boiling heptane.

We claim:
1. In a process for the production of poly-α-monoolefins by polymerization of α-monoolefins containing from 2 to 6 carbon atoms in a reactor at a temperature of from 20 to 170° C. and a pressure of from atmospheric to 100 atmospheres wherein a catalyst selected from the group consisting of chromium oxides and mixtures of (a) alkylaluminum compounds and alkylberyllium compounds containing from 1 to 10 carbon atoms and (b) compounds of metals of Groups IV–B to VII–B and VIII of the periodic chart of the elements is used and a fluidized bed is formed by the catalyst and the poly-α-monoolefins and the flow velocity of the α-monoolefins is from 5 to 15 cm./sec., the improvement which comprises using a fluidized bed having a ratio of diameter to height of from 1:1 to 1:8 and agitating said fluidized bed by means of an agitator which has attached to its shaft a plurality of agitating members arranged at a vertical distance from each other and which rotates at a speed of from 20 to 250 r.p.m., said members covering substantially all of a given section within said reactor, whereby the formed polymer particles and the particles of catalyst are moved in the direction of flow of the monoolefins.

2. In a process for the production of poly-α-monoolefins by polymerization of α-monoolefins containing from 2 to 6 carbon atoms in a reactor at a temperature of from 20 to 170° C. and a pressure of from atmospheric to 100 atmospheres wherein a catalyst selected from the group consisting of chromium oxides and mixtures of (a) alkylaluminum compounds and alkylberyllium compounds containing from 1 to 10 carbon atoms and (b) compounds of metals of Groups IV–B to VII–B and VIII of the periodic chart of the elements is used and a fluidized bed is formed by the catalyst and poly-α-monoolefins and the flow velocity of the α-monoolefins is from 5 to 15 cm./sec., the improvement which comprises maintaining the temperature of the polymerization mixture below the melting point of the formed poly-α-monoolefin utilizing a fluidized bed having a ratio of diameter to height of from 1:1 to 1:8 and agitating said fluidized bed by means of an agitator which has attached to its shaft a plurality of agitating members arranged at a vertical distance from each other and which rotates at a speed of from 20 to 250 r.p.m., said members covering substantially all of a given section within said reactor, whereby the formed polymer particles and the particles of catalyst are moved in the direction of flow of the monoolefins.

References Cited by the Examiner
UNITED STATES PATENTS

| | | | |
|---|---|---|---|
| 2,245,029 | 6/1941 | Gilley | 259—8 |
| 2,592,709 | 4/1952 | Kinnaird | 259—8 |
| 2,860,127 | 11/1958 | Banks | 260—94.9 |
| 2,988,543 | 6/1961 | Meyer et al. | 260—93.7 |
| 2,990,399 | 6/1961 | Peterlein | 260—94.9 |
| 2,996,492 | 8/1961 | Tegge et al. | 260—93.79 |

JOSEPH L. SCHOFER, *Primary Examiner.*

WILLIAM H. SHORT, *Examiner.*

F. L. DENSON, *Assistant Examiner.*